(12) United States Patent
Liu et al.

(10) Patent No.: US 11,156,859 B2
(45) Date of Patent: Oct. 26, 2021

(54) MANUFACTURING METHOD OF LIQUID CRYSTAL ANTENNA

(71) Applicant: TRUWIN OPTO-ELECTRONICS LIMITED, Guang Dong (CN)

(72) Inventors: Zhisheng Liu, Guangdong (CN); Xiangzhan Xu, Guangdong (CN); Zhiling Wang, Guangdong (CN); Taitian Lyu, Guangdong (CN); Zhuoqian Lu, Guangdong (CN); Lixiong Wang, Guangdong (CN); Jiqiang He, Guangdong (CN)

(73) Assignee: TRUWIN OPTO-ELECTRONICS LIMITED, Guang Dong (CN)

( * ) Notice: Subject to any disclaimer, the term of this patent is extended or adjusted under 35 U.S.C. 154(b) by 0 days.

(21) Appl. No.: 16/770,083

(22) PCT Filed: Mar. 14, 2019

(86) PCT No.: PCT/CN2019/078174
§ 371 (c)(1),
(2) Date: Jun. 5, 2020

(87) PCT Pub. No.: WO2020/181558
PCT Pub. Date: Sep. 17, 2020

(65) Prior Publication Data
US 2021/0208430 A1 Jul. 8, 2021

(30) Foreign Application Priority Data

Mar. 12, 2019 (CN) .......................... 201910185803.1

(51) Int. Cl.
*G02F 1/13* (2006.01)
*G02F 1/1343* (2006.01)
(Continued)

(52) U.S. Cl.
CPC ........ *G02F 1/1313* (2013.01); *G02F 1/13439* (2013.01); *H01Q 1/364* (2013.01); *H01Q 1/38* (2013.01)

(58) Field of Classification Search
CPC ..... G02F 1/1313; G02F 1/13439; H01Q 1/36; H01Q 1/364; H01Q 1/38; H01Q 3/34; H01Q 3/44; H01Q 3/46
See application file for complete search history.

(56) References Cited

U.S. PATENT DOCUMENTS

2014/0266897 A1    9/2014  Jakoby et al.
2018/0026374 A1*   1/2018  Chen ................. H01Q 21/065
                                                     343/810
2019/0146248 A1*   5/2019  Wang ................... G02F 1/1313
                                                     349/1

FOREIGN PATENT DOCUMENTS

CN    102463130    5/2012
CN    106932933    7/2017
(Continued)

OTHER PUBLICATIONS

"International Search Report (Form PCT/ISA/210) of PCT/CN2019/078174," dated Dec. 2, 2019, pp. 1-5.

*Primary Examiner* — Angela K Davison
(74) *Attorney, Agent, or Firm* — JCIP Global Inc.

(57) ABSTRACT

The disclosure discloses a liquid crystal antenna, including a first substrate and a second substrate which are oppositely arranged and a liquid crystal layer positioned between the first substrate and the second substrate, wherein a first metal film layer is arranged on one side, facing the second substrate, of the first substrate, a second metal film layer is arranged on one side, facing the first substrate, of the second substrate, the first substrate and the second substrate are rigid substrates, a seed layer is arranged between the first substrate and the first metal film layer, and a seed layer is
(Continued)

arranged between the second substrate and the second metal film layer. The disclosure also provides a method for manufacturing a liquid crystal antenna.

6 Claims, 3 Drawing Sheets

(51) Int. Cl.
*H01Q 1/36* (2006.01)
*H01Q 1/38* (2006.01)

(56) References Cited

FOREIGN PATENT DOCUMENTS

| | | |
|---|---|---|
| CN | 108321086 | 7/2018 |
| CN | 108490706 | 9/2018 |
| CN | 108963402 | 12/2018 |
| CN | 109314316 | 2/2019 |

* cited by examiner

MANUFACTURING METHOD OF LIQUID CRYSTAL ANTENNA

CROSS-REFERENCE TO RELATED APPLICATION

This application is a 371 of international application of PCT application serial no. PCT/CN2019/078174, filed on Mar. 14, 2019, which claims the priority benefit of China application no. 201910185803.1, filed on Mar. 12, 2019. The entirety of each of the above mentioned patent applications is hereby incorporated by reference herein and made a part of this specification.

BACKGROUND

Technical Field

The disclosure relates to the technical field of wireless communication, in particular to a liquid crystal antenna and a manufacturing method thereof.

Description of Related Art

Information networks are developing with each passing day, leading to major changes in various fields, among which 5G and satellite mobile Internet communication technologies are the hot technologies.

Antenna, as the core equipment for sending and receiving communication information, has become the key factor affecting the performance index of information networks and the application effect of users.

It is known that the existing phased array antenna has this performance index, but based on the national defense application background and chip manufacturing technology, the expensive production cost and high power consumption of the phased array antenna make it unaffordable for consumers in the consumer market, thus causing obstacles to the popularization of consumer products.

SUMMARY

In order to solve the above problems, a solution for a low-cost liquid crystal antenna suitable for large-scale manufacturing is provided.

The disclosure provides a liquid crystal antenna, including a first substrate and a second substrate which are oppositely arranged and a liquid crystal layer positioned between the first substrate and the second substrate, wherein a first metal film layer is arranged on one side, facing the second substrate, of the first substrate, a second metal film layer is arranged on one side, facing the first substrate, of the second substrate, the first substrate and the second substrate are rigid substrates, a seed layer is arranged between the first substrate and the first metal film layer, and a seed layer is arranged between the second substrate and the second metal film layer.

Preferably, the first metal film layer and the second metal film layer are each a chemically deposited layer laminated on the seed layer of the corresponding substrate.

Preferably, the first metal film layer and the second metal film layer are each composed of a chemically deposited layer and an electroplated metal layer which are sequentially laminated on the seed layer of the corresponding substrate.

Preferably, the metal materials of the first metal film layer and the second metal film layer are silver, copper, gold, aluminum, or alloys thereof.

Preferably, the conductivity of the metal materials is $\sigma$, the magnetic permeability is $\mu$, the frequency of signals carried by the liquid crystal antenna is f, and the skin depth $\delta = (1/\pi \, f \, \mu \, \sigma)^{1/2}$; and the thicknesses of the first metal film layer and the thicknesses of the second metal film layer are between 3 times and 5 times the skin depth $\delta$.

Preferably, the materials of the first metal film layer and the second metal film layer are copper, and the thicknesses of the metal film layers are not less than 2.0 µm.

Preferably, the material of the seed layers is metal oxide, and the thickness of the seed layers is less than 50 nm.

Preferably, an antenna radiation unit is also arranged on one side, away from the second substrate, of the first substrate, and the antenna radiation unit is a third metal film layer disposed on the side, away from the second substrate, of the first substrate.

Preferably, the rigid substrate is a glass substrate.

Preferably, the first metal film layer is provided with a grounding electrode, the second metal film layer is provided with a planar transmission line, the first metal film layer is further provided with a slit unit, and the second metal film layer is further provided with an offset line.

The disclosure also provides a method for manufacturing a liquid crystal antenna, the method is used for manufacturing the liquid crystal antenna as described above, and the method includes the following steps:

providing a first substrate; forming a first metal film layer on the first substrate through plating;

providing a second substrate; forming a second metal film layer on the second substrate through plating; and patterning the first metal film layer and/or the second metal film layer;

wherein before conducting plating on the substrates to form the metal film layers, a seed layer is prepared on the surface of each substrate.

Preferably, a method for plating the substrates includes the following step:

plating the surface of the seed layer with a chemically deposited layer through chemical deposition.

Preferably, a method for plating the substrates includes the following steps:

plating the surface of the seed layer with a chemically deposited layer through chemical deposition; and plating the surface of the chemically deposited layer with an electroplated metal layer through electroplating process.

Preferably, a method for manufacturing the seed layers is that the substrates are immersed into a prepared metal oxide solution by an immersion pulling method, and then the substrates are pulled out of the solution to attach metal oxides to the substrates.

Preferably, a first baking treatment is performed after the seed layers are generated.

Preferably, the seed layers are activated before the chemically deposited layers are plated on the surfaces of the seed layers, so that catalytically active particles are adsorbed on the seed layers.

Preferably, after plating the chemically deposited layers and before plating the electroplating metal layers, the chemically deposited layers are cleaned first, and then a second baking treatment is performed.

Preferably, after electroplating the electroplated metal layers, a cleaning step and a third baking treatment step are executed.

Preferably, the method for manufacturing the liquid crystal antenna further includes: forming a third metal film layer on one side, away from the second substrate, of the first substrate by plating.

Compared with the prior art, the disclosure has the following beneficial effects:

The metal film layers are plated on the glass substrate through electroplating, so that the thicknesses of the metal film layers can reach the µm grade, the performance of the liquid crystal antenna is well ensured, and the problems of repeated plating, low efficiency, serious thermal deformation and the like in a vacuum magnetron sputtering process are avoided. The metal film layers on the glass substrate include the seed layer, the chemically deposited layer and the electroplated metal layer in sequence. The adhesion between the metal film layer and the glass substrate is strong, and low-cost and large-scale manufacturing in the process can be realized. A solution for a low-cost liquid crystal antenna suitable for large-scale manufacturing is provided.

DESCRIPTION OF REFERENCE NUMERALS

11—first substrate, 12—third metal film layer, 13—first metal film layer, 14—first alignment layer, 15—slit unit, 21—second substrate, 22—second metal film layer, 23—second alignment layer, 30—liquid crystal layer, 40—sealant, 24—seed layer, 131—chemically deposited layer, 132—electroplated metal layer.

DESCRIPTION OF THE EMBODIMENTS

In order to make the objective, technical solutions and advantages of the present disclosure clearer, the present disclosure will be described in further detail below with reference to the accompanying drawings. Obviously, the described embodiments are only a part of the embodiments of the present disclosure, not all of the embodiments. Based on the embodiments of the present disclosure, all other embodiments obtained by those skilled in the art without creative labor are within the scope of the present disclosure.

A liquid crystal antenna and a manufacturing method thereof according to the present disclosure will be further described below with reference to the drawings and embodiments.

Embodiment 1

Figure 1:
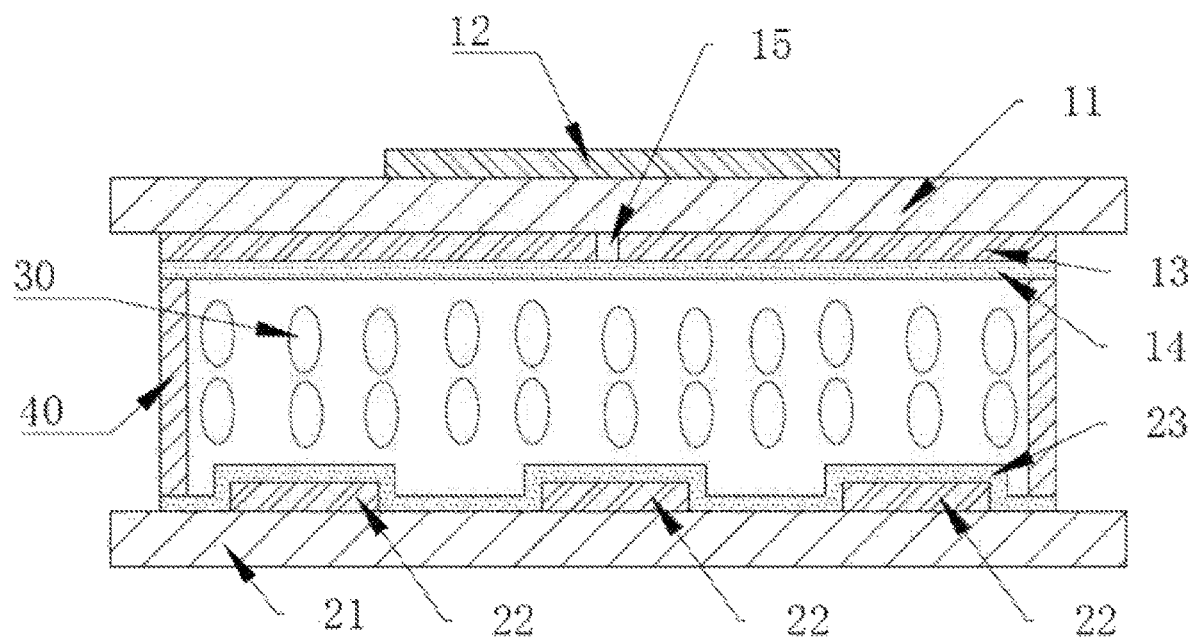
FIG. 1 is a structural diagram of a liquid crystal antenna provided in Embodiment 1 of the present disclosure.
Figure 2:
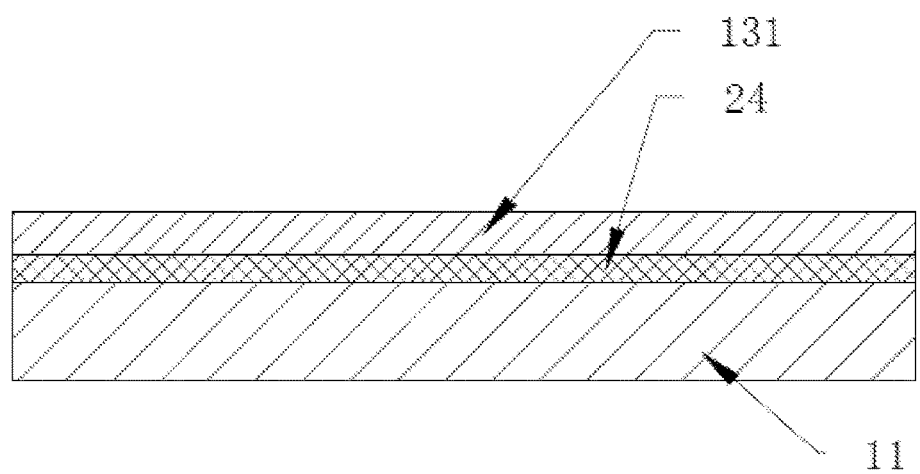
FIG. 2 is a structural diagram of a substrate, a seed layer and a metal film layer of the liquid crystal antenna provided in Embodiment 1 of the present disclosure.

FIG. 1 shows Embodiment 1 of the present disclosure, which provides a liquid crystal antenna. The liquid crystal antenna includes a first substrate 11 and a second substrate 21 which are oppositely arranged, and further includes a liquid crystal layer 30 positioned between the first substrate 11 and the second substrate 21.

There is also sealant 40 between the first substrate 11 and the second substrate 21. The sealant 40 is located at the edges of the first substrate 11 and the second substrate 21, and is used for sealing the liquid crystal layer 30. Preferably, supports are distributed in the liquid crystal layer 30.

The first substrate 11 and the second substrate 21 are made of materials with good effect on stability and insulation and extremely low dielectric loss. In the present embodiment, the first substrate 11 and the second substrate 21 are rigid substrates, which can be made of a glass material, molten quartz, a ceramic material or a ceramic thermosetting polymer composite, but is preferably a glass substrate.

The first substrate 11 is provided with a first conductive layer and the second substrate 21 is provided with a second conductive layer.

The first conductive layer includes a first metal film layer 13 disposed on one side, facing the second substrate 21, of the first substrate 11, and the second conductive layer includes a second metal film layer 22 disposed on one side, facing the first substrate 11, of the second substrate 21.

At least one of the first metal film layer 13 and the second metal film layer 22 is a patterned metal film layer.

The metal materials of the first metal film layer 13 and the second metal film layer 22 have high conductivity and magnetic permeability, which may be aluminum, copper, silver, gold, cadmium, chromium, molybdenum, niobium, nickel and iron, preferably silver, copper, gold, aluminum and alloys thereof.

The lower the loss of wireless communication is, the better the performance of wireless communication is, that is, the lower the insertion loss (including conductor loss) is, the better the performance is. It is known that the metal material and the thickness of the metal film layer are related to conductor loss, which can be embodied by the skin effect.

Due to the skin effect of alternating current, the skin effect indirectly increases the resistance of a conductor, and the energy and heat loss also increases. In high-frequency bands such as microwave, the skin effect is very obvious. Different metal materials have different skin depths.

Skin effect: when there is an alternating current or alternating electromagnetic field in the conductor, the current distribution inside the conductor is not uniform, and the current is concentrated on the outer skin part of the conductor; and the closer to the surface of the conductor, the greater the current density is, and the actual current inside the conductor is very small. As a result, the resistance of the conductor increases and the loss power of the conductor also increases. This phenomenon is called skin effect.

Skin depth δ is given by the following formula:

$$\delta=(1/\pi f\mu\sigma)^{1/2},$$

wherein µ represents the magnetic permeability of the metal material, σ represents the conductivity of the conductor, and f represents the frequency of a signal carried by the liquid crystal antenna.

Since the metal materials of the liquid crystal antenna need to have high conductivity and magnetic permeability, and silver, copper, gold, aluminum and alloys thereof are generally adopted, the skin effect required by the liquid crystal antenna generally requires the thicknesses of the corresponding first metal film layer 13 and second metal film layer 22 to be between 3 times and 5 times the skin depth δ respectively. The thickness of each metal film layer must reach the µm grade to ensure the performance of the liquid crystal antenna.

For the metal materials of silver, copper, gold, aluminum and alloys thereof, silver has the best conductivity but is expensive, and is generally suitable for vacuum magnetron sputtering process. Gold is more expensive and is not suitable for subtractive etching of patterns and wirings. Aluminum is generally suitable for vacuum magnetron sputtering process.

As the solution with the best cost performance, the metal materials of the metal film layers are preferably copper. The materials of the first metal film layer 13 and the second metal film layer 22 are both copper, and the thicknesses of the first metal film layer 13 and the second metal film layer 22 are of the µm grade, which can ensure the performance of the liquid crystal antenna. Preferably, the thicknesses of the first metal film layer 13 and the second metal film layer 22 are not less than 2.0 µm.

It is known that metal film plating processes carried out on glass substrates adopt vacuum magnetron sputtering (PVD), chemical vapor deposition (CVD) and sublimation evaporation as mature large-scale manufacturing methods in existing liquid crystal panels. The materials of the metal film layers are silver, copper, gold, aluminum and alloys thereof. Chemical vapor deposition (CVD) used in the manufacture of liquid crystal panels is not suitable for the manufacture of pure metal film layers, but is suitable for the manufacture of materials such as III-V, II-IV, IV-VI binary or polynary compounds, oxides, sulfides, nitrides, carbides, and hydrides. Sublimation evaporation is suitable for OLED luminescent materials, and the pure silver evaporation process is suitable for in a solution where the entire surface of a cathode is not etched, but is not suitable for making products with wires or patterns due to its high tendency to oxidization. In addition, the high cost of an entire thick film is also a problem.

For the vacuum magnetron sputtering process, to make a thick film layer of the µm grade, repeated plating is necessary, which results in low efficiency and serious thermal deformation. Especially for plating of a glass substrate with a large substrate size of G5 or more and a thin thickness (0.4 mm/0.5 mm), due to the high temperatures in these two processes, bending and even breakage of the plated substrate may be caused, and the yellow-light process cannot be carried out normally. Therefore, even if a thick film layer of the µm grade is obtained through improvement, the problems of low efficiency and high cost are still there, resulting in high cost of the final liquid crystal antenna.

In the present application, the metal film layers are plated on the glass substrates by the chemical deposition method, which can avoid the problems of repeated plating, low efficiency, serious thermal deformation and the like in the vacuum magnetron sputtering process.

The chemical deposition method herein is different from chemical vapor deposition (CVD). Chemical vapor deposition (CVD) is dry deposition, while chemical deposition is carried out in a solution and is an oxidation-reduction reaction. When the materials of the first metal film layer 13 and the second metal film layer 22 are both copper, the chemical deposition method may also be referred to as a chemical copper deposition method. The metal film layers can be formed on the substrates through chemical deposition method.

The applicant found that because the surface of the substrate, such as a glass surface, is very smooth, the chemical copper deposition method and the electroplating method in the prior art are not suitable for directly plating a metal film layer, such as a copper layer, on the smooth glass substrate, or even if the metal film layer is plated, the adhesion between the metal film layer and the glass substrate is extremely poor, and the serious problem which is the metal film layer tends to fall off the smooth glass surface would be caused.

In one embodiment, the first metal film layer 13 is formed by plating a film on the first substrate 11 through the chemical deposition process. In order to solve the problem that a metal film layer cannot be made on a smooth substrate, before plating, a seed layer 24 is formed on the surface of the substrate first, which can greatly improve the adhesion between the metal film layer and the glass. The seed layer 24 is a metal oxide film, and the metal oxide is, for example, tin oxide, nickel oxide, titanium oxide, copper oxide or a mixture thereof. The thickness of the seed layer 24 affects the performance and loss of the antenna, so the seed layer 24 is generally thin, for example, less than 50 nm thick. Preferably, the seed layer 24 has a thickness of less than 20 nm.

After the seed layer 24 is made, a chemically deposited layer 131 is plated on the surface of the seed layer 24 by the chemical deposition method. In this way, the chemically deposited layer 131 can be obtained. Preferably, the materials of the metal film layers are copper, and the chemical deposition method is a chemical copper deposition method. The chemically deposited layer 131 is a deposited copper layer.

By the above method, the metal film layers can be obtained by chemical deposition method. The first metal film layer 13 is a chemically deposited layer 131 laminated on the seed layer 24 of the corresponding first substrate 11. The second metal film layer 22 is a chemically deposited layer 131 laminated on the seed layer 24 of the corresponding second substrate 21. The thickness of the chemically deposited layer 131 and an electroplated metal layer 132 of the first metal film layer 13 is 2.0 µm or more. The thickness of the chemically deposited layer 131 and an electroplated metal layer 132 of the second metal film layer 22 is 2.0 µm or more.

Although it is easy to obtain the metal film layers by electroless chemical deposition method, the surface of the metal film layer is rough, and the porosity of the film layer is high, which means that atoms are not closely arranged. These all affect the performance of the antenna. Besides, the plating efficiency is lower than that of electrocoppering.

After the conductive layers of the metal film layers are formed through plating, the conductive layers can be patterned according to the actual situation to obtain patterned metal film layers.

In a specific embodiment, the second conductive layer and the first conductive layer are both patterned metal film layers. In other embodiments, it is also possible that the first conductive layer is a planar electrode, such as a planar grounding electrode, so that the patterning step can be omitted for the first conductive layer, and the second conductive layer is a patterned metal film layer, such as a phase shifter electrode.

The liquid crystal antenna further includes a first alignment layer 14 and a second alignment layer 23 disposed on the two sides of the liquid crystal layer 30 respectively. The first alignment layer 14 is prepared on the first substrate 11 on which the first conductive layer is fonned, and the second alignment layer 23 is prepared on the second substrate 21 on which the second conductive layer is formed. The alignment layers are used to define the initial deflection angle of liquid crystal molecules of the liquid crystal layer 30.

The first substrate 11, the second substrate 21, the liquid crystal layer 30, a first conductive layer, and a second conductive layer constitute a liquid crystal phase shifter. The liquid crystal antenna further includes an antenna radiation unit. The antenna radiation unit is used for radiating microwave signals to realize the feed-in and feed-out of microwave signals. In the present embodiment, the antenna radiation unit is disposed on one side, away from the second substrate 21, of the first substrate 11.

The antenna radiation unit is made of a highly conductive material. The antenna radiation unit can be a rectangular, circular or square patch, and can be chamfered, or can be attached to a liquid crystal phase shifter through SMT. Alternatively, it is more preferable that the antenna radiation unit is a patterned third metal film layer 12 disposed on one side, away from the second substrate 21, of the first substrate 11. The thickness of the third metal film layer 12 do not need to reach the thicknesses of the first metal film layer 13 and the second metal film layer 22.

In the present embodiment, the second conductive layer includes a phase shifter electrode, which is a planar transmission line for transmitting microwave signals. The planar transmission line is preferably a microstrip line. The shape of the microstrip line can be serpentine or spiral, which is not limited, as along as the transmission of the microwave signals can be realized.

The first conductive layer includes a grounding electrode. The first conductive layer, that is, the first metal film layer 13, is also provided with a slit unit 15. The slit unit 15 is a groove formed in the first metal film layer 13 and is located below the antenna radiation unit. The slot unit 15 is used to couple RF signals between the antenna radiation unit and the phase shifter.

The liquid crystal antenna also includes an offset line. In one embodiment, the offset line may be disposed on the second metal film layer of the second substrate. By applying a voltage between the microstrip line and the grounding electrode through the offset line, the effective dielectric constant of liquid crystal can be changed, thus changing the phase of the microwave signals.

When no electric field is applied between the microstrip line and the grounding electrode, the liquid crystal molecules are arranged in a preset direction under the action of the first alignment layer and the second alignment layer.

When an electric field is applied between the microstrip line and the grounding electrode, the electric field drives deflection of the direction of the liquid crystal molecules in the liquid crystal layer 30.

The microwave signals are transmitted between the microstrip line and the grounding electrode. During the transmission of the microwave signals, the phase will be changed due to the deflection of the liquid crystal molecules, thus realizing the phase shift function of the microwave signals. By controlling the voltage on the microstrip line and the grounding electrode, the deflection angle of liquid crystal in the liquid crystal layer 30 can be controlled, and further the phase adjusted in the phase shifting process can be controlled.

The effective dielectric constant of the liquid crystal is changed by controlling the voltage applied to the liquid crystal layer 30 based on the dielectric anisotropy characteristic and the low power consumption characteristic of the liquid crystal material, thereby controlling the phase adjusted in the phase shifting process. Two-dimensional patterns are formed by specially designed liquid crystal antenna units with different electrostatic capacitances. Electromagnetic waves received or emitted from the antenna are given with phase differences corresponding to the electrostatic capacitances of each antenna unit, and the two-dimensional patterns formed by the antenna units with different electrostatic capacitances have strong directivity (beam scanning) in a specific direction, thus realizing the function of mutual conversion between electromagnetic waves received or emitted by the antenna and radio frequency signals (voltage signals).

According to the technical solution of the present application, the seed layers 24 are firstly manufactured on the surfaces of the substrates, and then the corresponding metal film layers are formed on the seed layers 24 through plating, so that the thicknesses of the metal film layers can reach the μm grade, and the performance of the liquid crystal antenna is ensured. The problems of repeated plating, low efficiency, serious thermal deformation and the like in the vacuum magnetron sputtering process are avoided, the adhesion between the metal film layers and the substrates is strong, and a liquid crystal antenna which can be manufactured on a large scale at low cost is provided.

Embodiment 2

As a further improvement on Embodiment 1, the present embodiment is different from Embodiment 1 in that, the chemically deposited layers 131 are first fabricated on the seed layers 24 of the corresponding substrates, and then the electroplated metal layers 132 are fabricated on the chemically deposited layers 131 by an electroplating process. That is, the metal film layers are plated on the substrates by oppositely bonding chemical deposition with electroplating. The electroplating process is different from the chemical deposition method in that electroplating is an electrolytic reaction which requires power to be applied to a substrate carrier; however, chemical deposition method, such as chemical copper deposition method, is an oxidation-reduction reaction which does not require power on the substrate carrier.

Figure 3:
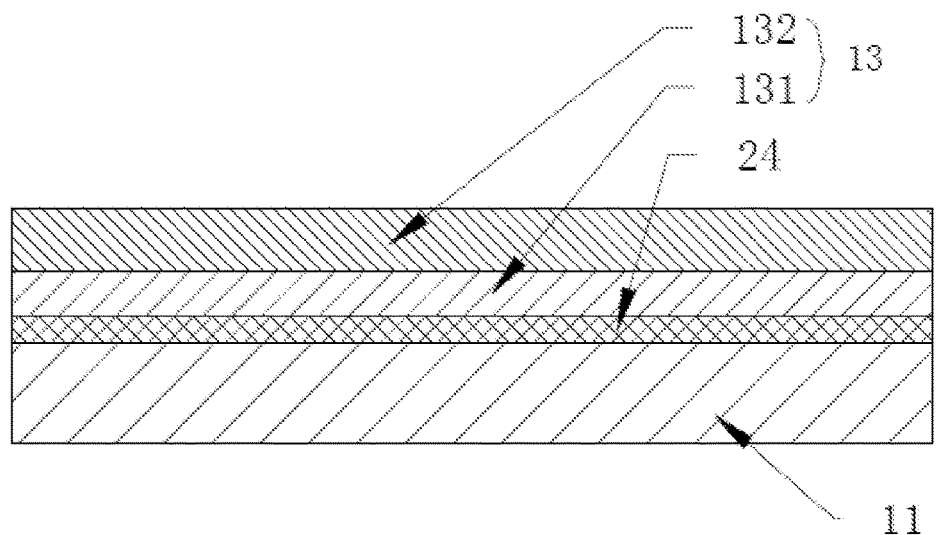
FIG. 3 is a structural diagram of a substrate, a seed layer and a metal film layer of a liquid crystal antenna provided in Embodiment 2 of the present disclosure.
Figure 4:
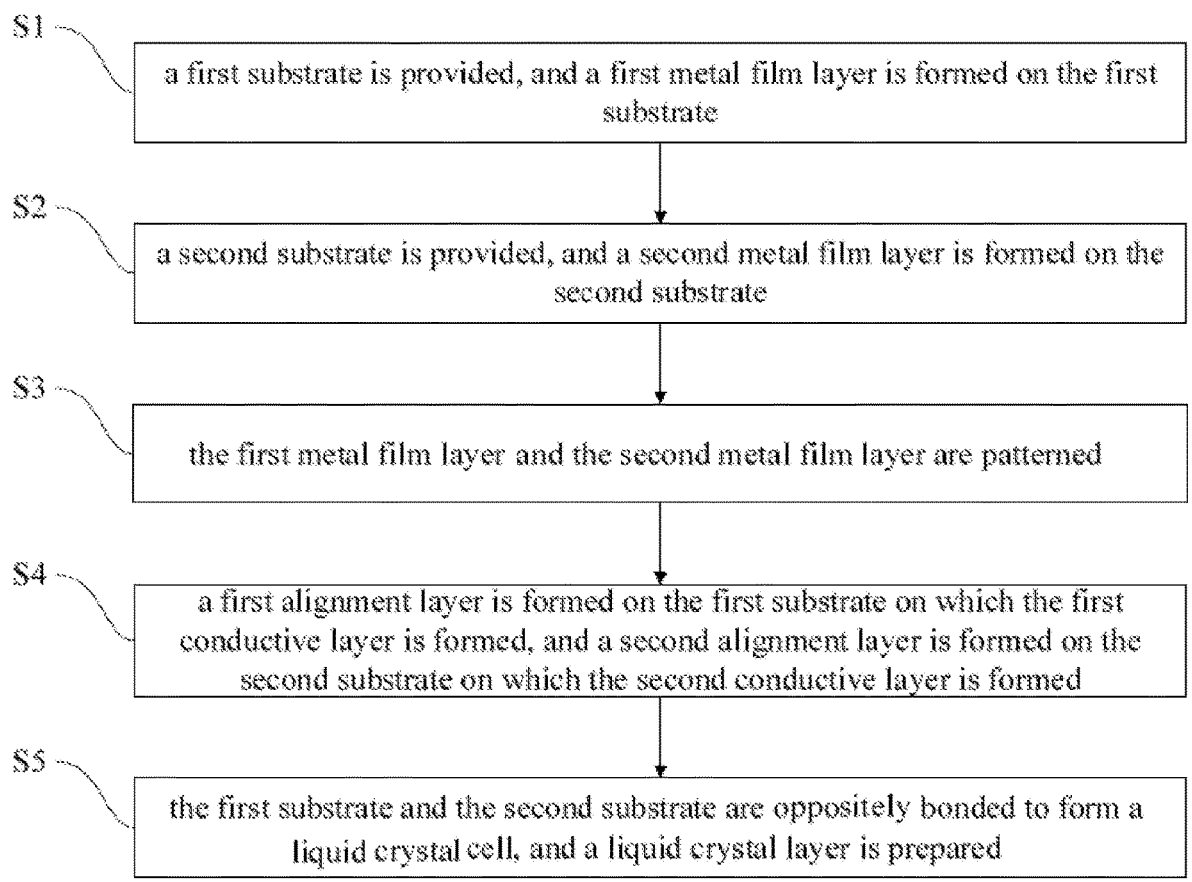
FIG. 4 is a flowchart of a method for manufacturing a liquid crystal antenna provided in Embodiment 3 of the present disclosure.
Figure 5:
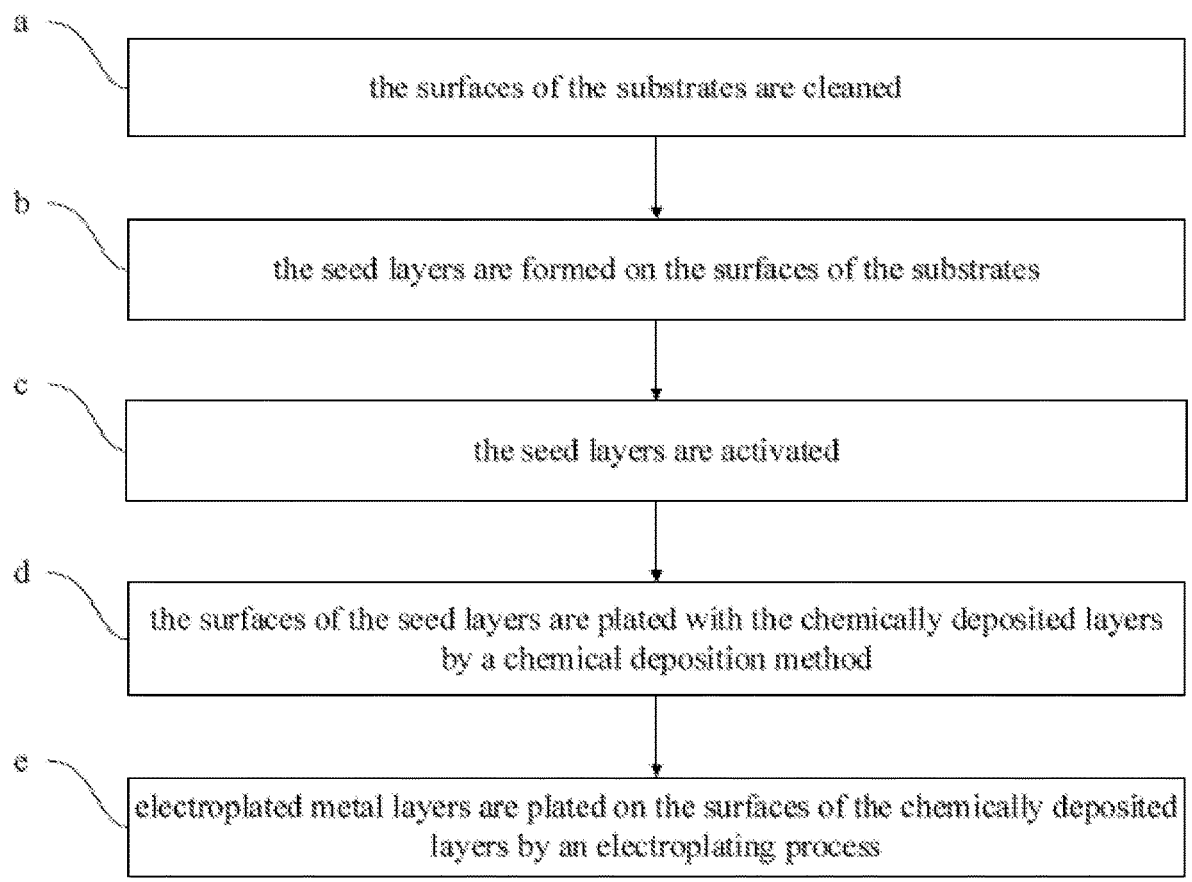
FIG. 5 is a flowchart of a method for plating a metal film layer on a glass substrate provided in Embodiment 3 of the present disclosure.

As shown in FIG. 3, the first metal film layer 13 and the second metal film layer 22 are each composed of the seed layer 24, the chemically deposited layer 131, and the electroplated metal layer 132 which are sequentially laminated on the corresponding substrate.

In the electroplating process, the chemically deposited layers 131 serve as a conductive part. The thicknesses of the chemically deposited layers 131 are smaller than the thicknesses of the electroplated metal layers 132. Preferably, the metal materials of the chemically deposited layers 131 and the electroplated metal layers 132 are the same. The metal materials of the metal film layers are preferably copper, the chemically deposited layers 131 are deposited copper layers, and the electroplated metal layers 132 are also copper layers. The thicknesses of the chemically deposited layers 131 are 0.1 μm-1.0 μm, and the thicknesses of the electroplated metal layers 132 are 2.0 μm or more.

Compared with the chemical deposition method, the electroplating method has the advantages that the surface of the obtained metal film layer is smooth, and internal metal atoms are closely arranged, so that the antenna has better performance.

Moreover, the efficiency of electroplating is greatly improved compared with the forming efficiency of the chemically deposited layers 131.

Embodiment 3

This specific embodiment provides a method for manufacturing the liquid crystal antenna as in Embodiment 2. The method for manufacturing the liquid crystal antenna includes the following steps:

Step S1: a first substrate 11 is provided; a seed layer 24 is prepared on the first substrate 11, and a first metal film layer 13 is formed on the seed layer 24 through plating;

Step S2: a second substrate 21 is provided; a seed layer 24 is prepared on the second substrate 21, and a second metal film layer 22 is formed on the seed layer 24 through plating; and Step S3: the first metal film layer 13 and/or the second metal film layer 22 are patterned.

A method for plating the seed layers 24 includes the following step: chemically deposited layers 131 are plated on the surfaces of the seed layers 24 by a chemical deposition method. When the metal film layers are made of copper, for example, the chemical deposition method is a chemical copper deposition method, deposited copper layers are formed by plating the seed layers 24.

It should be noted that the sequence of step S1 and step S2 can be adjusted.

When the metal film layers are patterned in step S3, if one of the conductive layers is a planar electrode, the patterning step can be omitted.

After the metal film layers are patterned in step S3, the method for manufacturing the liquid crystal antenna further includes the following step:

Step S4: a first alignment layer 14 is formed on the first substrate 11 on which the first conductive layer is formed, and a second alignment layer 23 is formed on the second substrate 21 on which the second conductive layer is formed.

The method for manufacturing the liquid crystal antenna further includes the following step:

Step S5: the first substrate 11 and the second substrate 21 are oppositely bonded to form a liquid crystal cell, and a liquid crystal layer 30 is prepared.

Specifically, in one embodiment, the first substrate 11 and the second substrate 21 may be first oppositely bonded to form the liquid crystal cell, which is then filled with the liquid crystal layer 30. It is known that before the first substrate 11 and the second substrate 21 are oppositely bonded, sealant 40 is also prepared on one of the substrates, and the sealant 40 forms an accommodation space between the first substrate 11 and the second substrate 21 for receiving liquid crystal. After the liquid crystal cell is filled with the liquid crystal layer 30, the liquid crystal cell is sealed and the sealant 40 is cured.

In other embodiments, the order of oppositely bonding to form the liquid crystal cell and preparing the liquid crystal layer 30 is not limited to the above, but may also be: after one of the substrates is coated with the sealant 40, liquid crystal is dripped on the substrate to form the liquid crystal layer 30, the first substrate 11 and the second substrate 21 are oppositely bonded to form the liquid crystal cell, and then the sealant 40 is cured.

The patterning process is known to those skilled in the art, and is illustrated below, but the specific patterning method is not limited thereto. As a conductive layer, the first metal film layer 13 can be patterned as follows:

the first metal film layer 13 is coated with a layer of photoresist; the photoresist is exposed by using a mask plate to form a photoresist non-retained area and a photoresist retained area, wherein the photoresist retained area corresponds to the area where a pattern of the first conductive layer is located, and the photoresist non-retained area corresponds to the area other than the above pattern; development is conducted, wherein the photoresist in the photoresist non-retained area is completely removed, and the thickness of the photoresist in the photoresist retained area remains unchanged; the conductive layer in the photoresist non-retained area is completely etched away through etching; and the remaining photoresist is stripped to form the pattern of the first conductive layer.

The alignment layers can be made by PI friction process in the prior art so as to form orientational grooves on the surfaces, which will not be detailed here.

In step S1 and step S2, a method for plating the substrates with the metal film layers mainly involves the process of the combination of chemical deposition method and electroplating, and includes the following steps:

Step a the surfaces of the corresponding substrates are cleaned to prevent dust/dirt on the substrates from affecting the adhesion and uniformity of the seed layers 24 on the substrates, wherein cleaning includes rinsing and drying treatment;

Step b the seed layers 24 are formed on the surfaces of the substrates by an immersion pulling process, wherein the seed layers 24 can greatly improve the adhesion between the metal film layers and the substrates;

Step c the seed layers 24 are activated by adsorbing a layer of metal particles (such as palladium) with catalytic activity on the seed layers 24, so that the metal layers can be made on the surfaces of the substrates by using chemically deposited layers 131 or an electroplating method;

Step d the surfaces of the seed layers 24 are plated with the chemically deposited layers 131 by a chemical deposition method; and Step e electroplated metal layers 132 are plated on the surfaces of the chemically deposited layers 131 by an electroplating process. The thicknesses of the electroplated metal layers 132 need to be able to ensure the performance of the liquid crystal antenna.

It should be noted that step a above is an optional step, and step c above is a more optimized solution, that is, plating can still be carried out without step c, but the effect is slightly poor.

The immersion pulling manufacturing process of the seed layers 24 includes the following steps: a solution with a metal oxide as the main component is prepared, the substrates are immersed into the prepared metal oxide solution by the immersion pulling method, the substrates are pulled out of the solution to attach the metal oxide to the substrates, and then drying treatment is performed, such as natural air drying or drying at a certain temperature, to obtain metal oxide films on the substrates.

The thicknesses of the seed layers 24 affect the performance and loss of the antenna, so the thicknesses of the seed layers 24 are generally small, for example, less than 50 nm. In order to cover the smooth substrate surfaces with the seed layers 24, in the present embodiment, the immersion pulling process is adopted to generate the seed layers 24 on the substrate surfaces. Through the immersion pulling process, uniform thin film layers can be plated on the smooth substrate surfaces. Other processes, such as vacuum magnetron sputtering, are not suitable for making the seed layers 24 because the surface of a film prepared thereby is too smooth.

The above method for plating the glass substrates mainly adopts the electroplating process. By making the seed layers 24, the problem that a metal film layer such as a copper layer cannot be directly plated on a smooth glass substrate by the electroplating process in the prior art is solved. The adhesion between the metal film layers and the glass substrates is strong. Compared with the vacuum magnetron sputtering process, the method does not require repeated plating, can produce a film layer with a thickness of the μm grade, has high efficiency and yield, reduces the cost of the final liquid crystal antenna, and can realize large-scale manufacture.

By the method for plating the substrates, the first conductive layer and the second conductive layer with μm-grade thicknesses can be produced on a large scale at low cost. By the above method for plating the glass substrates and the existing method for manufacturing a liquid crystal panel, the liquid crystal antenna can be produced in large quantities.

As a preferred solution, the above method for plating the glass substrates further includes performing a first baking treatment after the seed layers 24 are generated in step b and before the seed layers 24 are activated in step c.

The function of the first baking treatment is to enhance the adhesion to glass through high-temperature baking.

After the chemically deposited layers 131 are plated in step d and before the electroplated metal layers 132 are plated in step e, chemical liquid on the surfaces of the chemically deposited layers 131 is cleaned to prevent residual chemical liquid from polluting the surfaces of the chemically deposited layers 131. As a preferred solution, after the chemically deposited layers 131 are cleaned, a second baking treatment is performed.

The function of the second baking treatment is to release the stress accumulated in the process of making the chemically deposited layers 131 and enhance the metal compactness and adhesion of the chemically deposited layers 131 through high-temperature baking.

Process of the electroplating or the chemically deposited layer 131 uses the principles of electrochemical reactions to transfer metal ions to the surface of the substrate through the current effect and stack the metal ions. As it is difficult to accurately stack metal atoms, the result of the process is that the porosity of the metal film layer is high, and the atoms are not closely arranged. Through baking, the metal atoms are stacked and arranged again under thermal stress at a high temperature, so that the metal atoms are closer, the attraction force between the atoms is greater, and the metal compactness and adhesion of the chemically deposited layers 131 are enhanced.

As a preferred solution, after the formation of the electroplated metal layers 132 in step e, cleaning is performed to remove the chemical liquid on the electroplated metal layers 132 to prevent residual chemical liquid from polluting the electroplated metal layers 132, and then third baking treatment is carried out.

The function of the third baking treatment is similar to that of the second baking treatment above through high-temperature baking.

According to the present application, baking treatment is conducted several times at different stages, so that the stress accumulated in the previous film layer manufacturing process is released in time, the adhesion between the corresponding film layer and the glass substrate is enhanced, the adhesion can be as high as that of the vacuum magnetron sputtering plating technology, and the technical index is that the adhesion tested by a cross-cut tester is more than 5B. After the adhesion is satisfactory, the liquid crystal antenna can be produced in large quantities in an existing liquid crystal panel production line.

By baking the corresponding metal layers at different stages through the three times of baking treatment, the finally obtained metal film layers have better compactness, which means lower resistivity in terms of physics, namely higher conductivity (=1/resistivity), and the dielectric loss of antenna signal transmission is lower. The lower the loss of wireless communication is, the better the performance is. The denser metal film layers reduce the loss of the liquid crystal antenna.

An antenna radiation unit can be attached to one side, away from the second substrate 21, of the first substrate 11 through SMT.

Alternatively, the antenna radiation unit may be obtained by forming a metal film layer on the surface of the first substrate 11 and then treating the metal film layer. The antenna radiation unit is a patterned third metal film layer 12 arranged on one side, away from the second substrate 21, of the first substrate 11. The method for manufacturing the liquid crystal antenna further includes the following steps: a third metal film layer 12 is formed on one side, away from the second substrate 21, of the first substrate 11 by plating, and the third metal film layer 12 is patterned to obtain an antenna radiation unit. The forming of the third metal film layer 12 on the first substrate 11 may be performed before forming the first metal film layer 13 or after forming the first metal film layer 13, which is not limited herein. The patterning of the third metal film layer 12 may be performed after patterning the first metal film layer 13, but is not limited thereto. The specific operation can be carried out with reference to the above-mentioned method for plating the glass substrate and the patterning process.

Embodiment 4

This specific embodiment provides a method for manufacturing the liquid crystal antenna as in Embodiment 1. Different from Embodiment 3, each metal film layer includes only the chemically deposited layer 131 laminated on the seed layer 24 of the corresponding substrate, and does not include the electroplated metal layer 132.

Therefore, in step S1 and step S2, a method for plating the substrates with the metal film layers mainly involves the process of chemical deposition method, and includes the following steps:

Step a the surfaces of the corresponding substrates are cleaned to prevent dust/dirt on the substrates from affecting the adhesion and uniformity of the seed layers 24 on the substrates, wherein cleaning includes rinsing and drying treatment;

Step b the seed layers 24 are formed on the surfaces of the substrates by an immersion pulling process, wherein the seed layers 24 can greatly improve the adhesion between the metal film layers and the substrates;

Step c the seed layers 24 are activated by adsorbing a layer of metal particles (such as palladium) with catalytic activity on the seed layers 24, so that the metal layers can be made on the surfaces of the substrates by using chemically deposited layers 131 or an electroplating method; and Step d the surfaces of the seed layers 24 are plated with the chemically deposited layers 131 by a chemical deposition method.

It can be seen that compared with Embodiment 3, step e is omitted.

In addition, after plating the chemically deposited layers 131 in step d, chemical liquid on the surfaces of the chemically deposited layers 131 is cleaned to prevent residual chemical liquid from polluting the surfaces of the chemically deposited layers 131. As a preferred solution, after cleaning the chemically deposited layers 131, a second baking treatment is performed.

The function of the second baking treatment is to release the stress accumulated in the process of making the chemically deposited layers 131 and enhance the metal compactness and adhesion of the chemically deposited layers 131 through high-temperature baking.

Through baking, the metal atoms are stacked and arranged again under thermal stress at a high temperature, so that the metal atoms are closer, the attraction force between the atoms is greater, and the metal compactness and adhesion of the chemically deposited layers 131 are enhanced.

Compared with the prior art, the disclosure has the following beneficial effects:

By making the seed layers, the problem that a metal film layer such as a copper layer cannot be directly plated on a smooth glass substrate by the electroplating process in the prior art is solved. The adhesion between the metal film layers and the substrates is strong. Compared with the vacuum magnetron sputtering process, the method does not require repeated plating, can efficiently produce a film layer with a thickness of the μm grade, is suitable for large-scale manufacture, and reduces the cost of the final liquid crystal antenna.

By the method for plating the substrates, the first conductive layer and the second conductive layer with μm-grade thicknesses can be produced on a large scale at low cost. By the above method for plating the glass substrates and the existing method for manufacturing a liquid crystal panel, the liquid crystal antenna can be produced in large quantities.

Finally, it should be noted that the above embodiments are only used to illustrate the technical solutions of the embodiments of the present disclosure and not to limit them. Although the embodiments of the present disclosure have been described in detail with reference to the preferred embodiments, those of ordinary skill in the art should understand that the technical solutions of the embodiments of the present disclosure can still be modified or substituted equally, and these modifications or equivalent substitutions cannot make the modified technical solutions depart from the scope of the technical solutions of the embodiments of the present disclosure.

What is claimed is:

1. A method for manufacturing a liquid crystal antenna, including the following steps: providing a first substrate; forming a first metal film layer on the first substrate through plating; providing a second substrate; forming a second metal film layer on the second substrate through plating; patterning the first metal film layer and/or the second metal film layer; and forming a liquid crystal layer between the first substrate and the second substrate, wherein the first metal film layer is arranged on one side, facing the second substrate, of the first substrate, and the second metal film layer is arranged on one side, facing the first substrate, of the second substrate, wherein the first substrate and the second substrate are glass substrates, wherein before conducting plating on the first substrate and the second substrate to form the first metal film layer and the second metal film layer, a seed layer is prepared on a surface of the first substrate and a surface of the second substrate; wherein the method for plating the first substrate and the second substrate includes the following steps: plating a surface of the seed layer with a chemically deposited layer through chemical deposition; and plating a surface of the chemically deposited layer with an electroplated metal layer through an electroplating method.

2. The method for manufacturing the liquid crystal antenna according to claim 1, wherein a method for manufacturing the seed layers is that the first substrate and the second substrate are immersed into a prepared metal oxide solution by an immersion pulling method, and then the first substrate and the second substrate are pulled out of the solution to attach metal oxides to the first substrate and the second substrate.

3. The method for manufacturing the liquid crystal antenna according to claim 1, wherein a first baking treatment is performed after the seed layer are generated.

4. The method for manufacturing the liquid crystal antenna according to claim 1, wherein the seed layer are activated before the chemically deposited layer are plated on the surface of the seed layer, so that catalytically active particles are adsorbed on the seed layer.

5. The method for manufacturing the liquid crystal antenna according to claim 1, wherein after plating the chemically deposited layers and before plating the electroplated metal layers, the chemically deposited layers are cleaned first, and then a second baking treatment is performed.

6. The method for manufacturing the liquid crystal antenna according to claim 5, wherein after electroplating the electroplated metal layers, a cleaning step and a third baking treatment step are further executed.

\* \* \* \* \*